UNITED STATES PATENT OFFICE.

ARTHUR LÜTTRINGHAUS, OF MANNHEIM, AND LUDWIG EIFFLAENDER, OF LUDWIGS-HAFEN-ON-THE-RHINE, GERMANY, ASSIGNORS TO ADOLF KUTTROFF, OF NEW YORK, N. Y.

MANUFACTURE OF ANTHRAQUINONE DERIVATIVES AND NEW PRODUCTS RESULTING THEREFROM.

1,394,851.     Specification of Letters Patent.     Patented Oct. 25, 1921.

No Drawing.     Application filed November 3, 1920. Serial No. 421,540.

*To all whom it may concern:*

Be it known that we, ARTHUR LÜTTRINGHAUS and LUDWIG EIFFLAENDER, citizens of Germany, residing at Mannheim and Ludwigshafen-on-the-Rhine, respectively, Germany, have invented new and useful Improvements in the Manufacture of Anthraquinone Derivatives and New Products Resulting Therefrom, of which the following is a specification.

The object of this invention is the production of anthraquinone derivatives containing aryl-amino groups. We have discovered that compounds of such kind can be easily produced by treating an amino-anthraquinone compound containing one or more amino groups, or derivatives having substituents in the anthraquinone nucleus or in the amino group or in both of them, with metal arylids in the presence of primary aromatic amino compounds. Under the term "metal arylid" we understand aromatic amins in which the hydrogen attached to the nitrogen atom is wholly, or partially, substituted by a metal atom.

The metal arylids aforedefined, viz: aromatic amins in which the hydrogen attached to the nitrogen is wholly, or partially, substituted by a metal atom may be beforehand prepared or they may be formed in the course of the reaction by employing suitable metals, or metallic compounds, in particular metal amids, which together with the aromatic amins present give rise to the formation of the metal arylids. The production of the amino-anthraquinone derivatives containing aryl-amino groups goes on very easily and generally with good yield and at a surprisingly low temperature. The reaction is preferably influenced by employing weak oxidizing agents for instance by passing a current of air through the reaction mass. The products obtained by this process are highly valuable starting materials for the production of various dyestuffs.

The process is further illustrated by the following examples to which however the invention is not limited. The parts are by weight.

Example 1.

24 parts of 1-amino-2-methyl-anthraquinone are dissolved, in a stirring vessel, in 360 parts of anilin at about 50 degrees centigrade. The air is then replaced by an inert gas such as nitrogen and 15 parts of powdered sodium amid are added to the mass contained in the vessel. The temperature will at once rise to 60-65 degrees centigrade, the reaction mass thickens and takes an intensely green color. The temperature of the mass is still kept at about 60 degrees centigrade for about 20 minutes, then the contents of the vessel is treated with an excess of dilute hydrochloric acid, the violet crystals separated out are sucked off and washed first with hot dilute hydrochloric acid and finally with hot water.

In order to increase the yield, it is advantageous to pass a strong current of dry air through the reaction mixture whereby hydro compounds that may be formed simultaneously are oxidized and are thus rendered fit for further reaction.

It may be supposed that the reaction is of a quinoid nature, the amino-anthraquinone being transformed by the action of the metal arylid into a salt of the desmotrop quinoid form e. g.

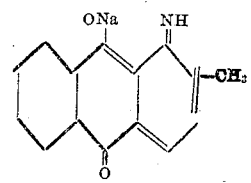

to which the aryl-amin then adds.

The crude product can be purified e. g. by extracting with cold acetone or by crystallization from suitable solvents. On crystallizing from glacial acetic acid violet black prisms of metallic luster are obtained, melting at 244 degrees centigrade. They are identical with 1-amino-2-methyl-4-phenyl-amino-anthraquinone prepared according to the known method by heating 1-amino-2-methyl-4-chlor-anthraquinone and anilin in the presence or absence of catalytic agents.

If instead of 1-amino-2-methyl-anthraquinone 1-amino-anthraquinone be employed, a product is obtained that from acetone crystallizes in prisms with metallic luster, melting at 232 degrees centigrade and dissolving in concentrated sulfuric acid with a red color. Its solutions in organic solvents are red colored as well. If strongly diluted they show a violet color with red fluorescence. This compound is not identical with 1-amino- 4 - phenyl - amino - anthraquinone obtained from 1 - amino - 4 - chlor - anthraquinone and anilin according to the known methods which compound melts at 192 degrees centigrade and dissolves in concentrated sulfuric acid with a violet color.

Example 2.

194 parts of sodium metal are transformed into the para-toluidine compound by heating with 1420 parts of para-toluidin and 0.3 parts of nickel oxid in a current of dry nitrogen. The solution is cooled to 50 degrees centigrade and a solution of 237 parts of 1-amino-2-methyl-anthraquinone in 950 parts of para-toluidin, heated to 90 degrees centigrade, is stirred in. The reaction mixture showing a dark green color is kept at about 65 degrees centigrade for about 60 minutes while passing a strong current of dry air through it. The mass may be worked up and the crude 1-amino-2-methyl-4-para-tolyl-amino-anthraquinone be purified as described in the preceding example.

Example 3.

20 parts of magnesium metal shavings are boiled with 750 parts of anilin and 1 part of sodium amid as described in the specification of the German Letters Patent No. 287,601 until the magnesium is entirely disappeared. Into the solution or suspension of magnesium anilid thus obtained, and cooled to about 100 degrees centigrade 60 parts of 1-amino-2-methyl-anthraquinone are stirred in. The reaction mixture at once gets a green color. After heating for two hours to from 100 to 120 degrees centigrade it is worked up in the usual manner.

By extracting the raw product with cold acetone and recrystallizing the residue from glacial acetic acid 1-amino-2-methyl-4-phenyl-amino-anthraquinone is obtained in a pure state.

Example 4.

5.6 parts of aluminium shavings are heated in a current of nitrogen as described in the aforementioned German Patent No. 287,601 with 150 parts of anilin until the aluminium is substantially disappeared. The solution of aluminium anilid is decanted from undissolved matter, if any; then 12 parts of 1-amino-2-methyl-anthraquinone are stirred in at about 100 degrees centigrade. The green reaction mixture is still kept at 100 degrees centigrade for two hours. The mass is then worked up and the 1-amino-2-methyl-4-phenyl-amino-anthraquinone obtained purified as described in the foregoing Example 3.

Example 5.

27 parts of 1-amino-2-methyl-4-chlor-anthraquinone are thoroughly mixed, while in a stirring vessel, with 400 parts of anilin, at 50 degrees centigrade, whereupon 16 parts of sodium amid are introduced. The mixture assumes a bluish green color and the temperature will quickly rise to 80 degrees centigrade at which it is kept for about 10 minutes. Then the mixture is treated with an excess of dilute hydrochloric acid, the violet crystalline precipitate sucked off and boiled with dilute hydrochloric acid. The dried product is extracted by means of methyl alcohol. It is identical with 1-amino-2-methyl-4-phenyl-amino anthraquinone obtained according to Example 1.

Example 6.

Into a solution of 15 parts of 1-phenyl-amino-anthraquinone in 150 parts of anilin 7.5 parts of sodium amid are introduced at 40 degrees centigrade. The temperature quickly rises to 60 degrees centigrade and the mixture gets dark green colored. It is still kept at 60 degrees centigrade for about 1 hour while passing a current of dry air through it and is then worked up in the described manner. A violet powder is obtained with good yield which after drying can be purified by extracting with methyl alcohol. It crystallizes from glacial acetic acid in the form of blue needles of metallic luster having a melting point of 217 degrees centigrade and being identical with the 1.4-bis-phenyl-amino-anthraquinone described by Ullmann & Billig, *Annalen der Chemie*, volume 381, page 19.

Example 7.

Into a solution of 5 parts of sodium in 110 parts of p-toluidin having a temperature of about 45 degrees centigrade a solution of 15 parts of 1-para-toluido-anthraquinone in 110 parts of para-toluidin having also 45 degrees centigrade is quickly introduced. The temperature of the reaction mixture will at once rise to 60 degrees centigrade and is kept for about 1 hour at 60 degrees centigrade while passing a strong current of dry air through it. Then the deeply green colored solution is treated with an excess of hot dilute hydrochloric acid, the separated 1.4-di-para-toluido-anthraquinone sucked off and washed first with hot dilute hydrochloric acid and then with hot water and dried. By extracting with cold methyl alcohol the product can easily be purified. It is formed with a good yield and shows all the known properties.

Example 8.

Into a solution of 11 parts of 2-amino-anthraquinone in 150 parts of anilin are introduced, at about 25 degrees centigrade, 8 parts of sodium amid after replacing the air by nitrogen. The solution gets dark green and the temperature rises to about 30 degrees centigrade. The reaction mixture is still kept at from 35 to 40 degrees centigrade for about 1 hour and then extracted several times by boiling with an excess of dilute hydrochloric acid. In order to completely purify the dark violet product it may be extracted, when dry, with hot methyl alcohol, then the residue is dissolved in hot anilin, filtered and methyl alcohol added to the filtrate. After standing for some time, needles of metallic luster will crystallize out which if once more treated in the described manner are obtained in an entirely pure state, melting then at 239 degrees centigrade. According to the analysis they represent an amino-phenyl-amino-anthraquinone.

In cold concentrated sulfuric acid the new compound dissolves with a bright blue color. On standing, the solution gets more reddish owing to sulfonation taking place. In alcohol, glacial acetic acid and anilin it dissolves with a magenta red color, in benzene with yellowish red color. It is not identical with the 1-phenyl-amino 2 amino-anthraquinone obtained from 2-amino-1-chlor-anthraquinone in the usual way that dissolves in cold concentrated sulfuric acid with a pale olive green color. The imidazoles obtainable from both compounds by the action of acetic anhydrid are different as well.

It is a particularly surprising fact that the same compound is obtained in a large quantity if 1-amino-anthraquinone dissolved in anilin is treated with sodium amid at about 120 degrees centigrade.

If in the above example the anilin be replaced by para-toluidin, an amino-para-tolyl-amino-anthraquinone is obtained which fuses at 253 degrees centigrade and also dissolves in cold concentrated sulfuric acid with a blue color. If ortho-toluidin be employed, a compound is obtained of similar properties fusible at 206 degrees centigrade.

*Example 9.*

Into a solution of 8 parts of 2-amino-1-chlor-anthraquinone in 120 parts of anilin 5 parts of sodium amid are stirred in at about 70 degrees centigrade in a current of nitrogen. The temperature rises quickly to about 80 degrees centigrade and is kept at this degree for 10 minutes while stirring. The intensely bluish green colored mixture is then treated with an excess of hot dilute hydrochloric acid, the crystalline violet precipitate sucked off, washed and dried.

The product is free from chlorin and identical with the compound obtained according to the foregoing example 8 from 2-amino-athraquinone and anilin.

*Example 10.*

15 parts of 2-phenyl-amino-anthraquinone (Fp. 234-236 degrees centigrade, see U. S. Patent 1,238,932) are dissolved in 200 parts of anilin at 25 degrees centigrade. To the solution 8 parts of sodium amid are added while stirring. The temperature rises quickly to 45 degrees centigrade, the mixture at the same time getting a green color. It is still kept at about 40 degrees centigrade for 1 hour while passing a dry current of air through it. It may then be worked up in a way similar to that described in the foregoing examples. The dry brownish black colored powder is extracted with cold acetone. The solution on standing separates out dark violet crystals of a weak metallic luster fusible at 152 degrees centigrade. According to the analysis they represent bis-phenyl-amino-anthraquinone.

The compound dissolves in alcohol and glacial acetic acid with magenta red color, in benzene with a red color. The solution in cold concentrated sulfuric acid is pure blue. By treating with oxidizing means, for instance by passing a current of air into its solution in anilin containing some potassium, or sodium, hydroxid at about 90 degrees centigrade, it is readily transformed into anthraquinone-dihydro-N-phenyl-phenazin described in example 1 of Letters Patent 1,280,648 which melts at 233 degrees centigrade.

*Example 11.*

23 parts of 2.6-diamino-anthraquinone are dissolved in 200 parts of anilin and 15 parts of sodium amid are then introduced in the course of 20 minutes, while stirring at a temperature of 80 degrees centigrade. The temperature rises to 100 degrees centigrade and is maintained at this degree for about 1 hour. The mass is then boiled with an excess of dilute hydrochloric acid. The dark violet compound may be recrystallized from boiling anilin. The product washed with methyl alcohol on being analyzed gives results corresponding to the formula: $C_{14}H_5O_2(NH_2)_2 NHC_6H_5$.

The compound dissolves in alcohol, glacial acetic acid and anilin crimson, in xylene and benzene brownish yellow and in cold concentrated sulfuric acid with a blue color.

In a similar manner other primary aromatic amins including benzidin and the like or other amino-anthraquinones may be employed.

We claim:

1. The process of manufacturing anthraquinone derivatives substituted by at least one aryl-amino group which consists in treating an amino-anthraquinone compound with a metal arylid in the presence of a primary aromatic amino compound.

2. The process of manufacturing anthraquinone derivatives substituted by at least one aryl-amino group which consists in treating an amino-anthraquinone compound with a metal arylid in the presence of a primary aromatic amino compound and in the presence of an oxidizing agent.

3. The process of manufacturing anthraquinone derivatives substituted by at least one aryl-amino group which consists in treating an amino-anthraquinone compound with a metal arylid in the presence of a primary aromatic amino compound and in the presence of air.

4. The process of manufacturing anthraquinone derivatives substituted by at least one aryl-amino group which consists in treating an amino-anthraquinone compound under metal arylid forming conditions in the presence of a primary aromatic compound.

5. The process of manufacturing anthraquinone derivatives substituted by at least one aryl-amino group which consists in treating an amino-anthraquinone compound with a primary aromatic amino compound and an alkali metal amid.

6. The process of manufacturing anthraquinone derivatives substituted by at least two aryl-amino groups which consists in treating an anthraquinone-aryl-amino compound with a metal arylid in the presence of a primary aromatic amino compound and in the presence of air.

7. As new articles of manufacture, aryl-amino-anthraquinone compounds representing a 2-amino-anthraquinone substituted by an aryl-amino group in the nucleus to which the 2-amino group is attached and soluble in cold concentrated sulfuric acid with a blue color.

8. As new articles of manufacture bis-aryl-amino-anthraquinones having both the aryl-amino groups in the same benzene nucleus, at least one of which is in a 2-position.

9. As a new article of manufacture bis-phenyl-amino-anthraquinone having two radicals of anilin in the same benzene nucleus one of which being in 2-position which compound corresponds to the formula $C_{26}H_{18}O_2N_2$ and dissolves in ordinary sulfuric acid with a bright blue color, and in glacial acetic acid with a magenta red color.

In testimony whereof we have hereunto set our hands.

ARTHUR LÜTTRINGHAUS.
LUDWIG EIFFLAENDER.